United States Patent
Busaba et al.

(10) Patent No.: US 8,250,440 B2
(45) Date of Patent: Aug. 21, 2012

(54) ADDRESS GENERATION CHECKING

(75) Inventors: Fadi Y. Busaba, Poughkeepsie, NY (US); Bruce C. Giamei, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1079 days.

(21) Appl. No.: 12/037,028

(22) Filed: Feb. 25, 2008

(65) Prior Publication Data
US 2009/0217135 A1    Aug. 27, 2009

(51) Int. Cl.
*G11C 29/00*    (2006.01)
(52) U.S. Cl. .................. 714/768; 711/207; 711/217
(58) Field of Classification Search .................. 714/768; 711/720, 217
See application file for complete search history.

(56) References Cited

U.S. PATENT DOCUMENTS

| | | | |
|---|---|---|---|
| 3,248,698 A * | 4/1966 | Carter et al. ............... 714/53 |
| 4,378,591 A | 3/1983 | Lemay | |
| 4,852,101 A * | 7/1989 | Kobayashi et al. ........... 714/756 |
| 5,299,164 A | 3/1994 | Takeuchi et al. | |
| 5,511,017 A | 4/1996 | Cohen et al. | |
| 5,790,443 A | 8/1998 | Shen et al. | |
| 5,905,665 A | 5/1999 | Rim | |
| 6,341,327 B1 | 1/2002 | Sager | |
| 6,647,484 B1 * | 11/2003 | Jiang et al. .................... 711/220 |
| 6,691,264 B2 * | 2/2004 | Huang ........................ 714/723 |
| 6,918,024 B2 | 7/2005 | Ishii | |
| 7,937,538 B2 * | 5/2011 | Furtek et al. ................ 711/149 |
| 2003/0208664 A1 * | 11/2003 | Singh ........................... 711/165 |
| 2005/0278572 A1 | 12/2005 | Busaba et al. | |

FOREIGN PATENT DOCUMENTS

WO    8402016    5/1984

OTHER PUBLICATIONS

International Business Machines Corporation (IBM), z/Architecture Principles of Operation, Sixth Edition (Apr. 2007), 1216 pages(split into 4 parts).

* cited by examiner

*Primary Examiner* — Guy Lamarre
(74) *Attorney, Agent, or Firm* — Cantor Colburn LLP; John Campbell

(57) ABSTRACT

A method for address generation checking including receiving a starting memory address for a data, an ending memory address for the data, a length value of the data, and an address wrap indicator value that indicates if the data wraps from an end of a memory block to a start of the memory block, determining whether the ending memory address is equal to a sum of the starting memory address added to a difference of the length value to the address wrap indicator value, and transmitting an error signal that indicates an error occurred in a generation of the starting memory address or the ending memory address if the ending memory address is not equal to the sum.

17 Claims, 10 Drawing Sheets

ADDRESS GENERATION CHECKING

BACKGROUND OF THE INVENTION

This invention relates generally to computer processor operation, and more particularly to providing a method, system, and computer program product for address generation checking.

With the continuing development and use of modern computer systems, the demand has increased for processors that operate without causing data corruption. For example, computers or microprocessors are used in a number of critical functions where consistent, accurate processing is needed, such as life supporting medical devices, financial transaction systems, and automobile safety and control systems. A common approach to meet this demand is to duplicate processor circuitry and compare the resulting duplicate functionality to detect processor errors, such as errors in the generation of addresses that are used to access stored data for processing purposes. However, an increased amount of component space (or area), processing time (e.g., added delay or latency), and power is needed to provide such duplication of processor logic, which can be inefficient for various applications. Thus, an approach to check for such address generation errors without the use of duplicate circuitry is desirable.

BRIEF SUMMARY OF THE INVENTION

A method, system, and computer program product for address generation checking is provided. An exemplary method embodiment includes receiving a starting memory address for a data, an ending memory address for the data, a length value of the data, and an address wrap indicator value that indicates if the data wraps from an end of a memory block to a start of the memory block, determining whether the ending memory address is equal to a sum of the starting memory address added to a difference of the length value to the address wrap indicator value, and transmitting an error signal that indicates an error occurred in a generation of the starting memory address or the ending memory address if the ending memory address is not equal to the sum.

An exemplary system embodiment includes an address generation checking unit configured to receive a starting memory address for a data, an ending memory address for the data, a length value of the data, and an address wrap indicator value that indicates if the data wraps from an end of a memory block to a start of the memory block, determine whether the ending memory address is equal to a sum of the starting memory address added to a difference of the length value to the address wrap indicator value, and transmit an error signal that indicates an error occurred in a generation of the starting memory address or the ending memory address if the ending memory address is not equal to the sum.

An exemplary computer program product embodiment includes a computer usable medium having a computer readable program, wherein the computer readable program, when executed on a computer, causes the computer to receive a starting memory address for a data, an ending memory address for the data, a length value of the data, and an address wrap indicator value that indicates if the data wraps from an end of a memory block to a start of the memory block, determine whether the ending memory address is equal to a sum of the starting memory address added to a difference of the length value to the address wrap indicator value, and transmit an error signal that indicates an error occurred in a generation of the starting memory address or the ending memory address if the ending memory address is not equal to the sum.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

Exemplary embodiments of the invention described herein provide a method, system, and computer program product for address generation checking. In accordance with such exemplary embodiments, processor address generation error checking without the use of duplicate circuitry is provided This error checking is provided with a reduced hardwood overhead by utilizing existing address generation hardware for inputs to check for errors.

Figure 1:
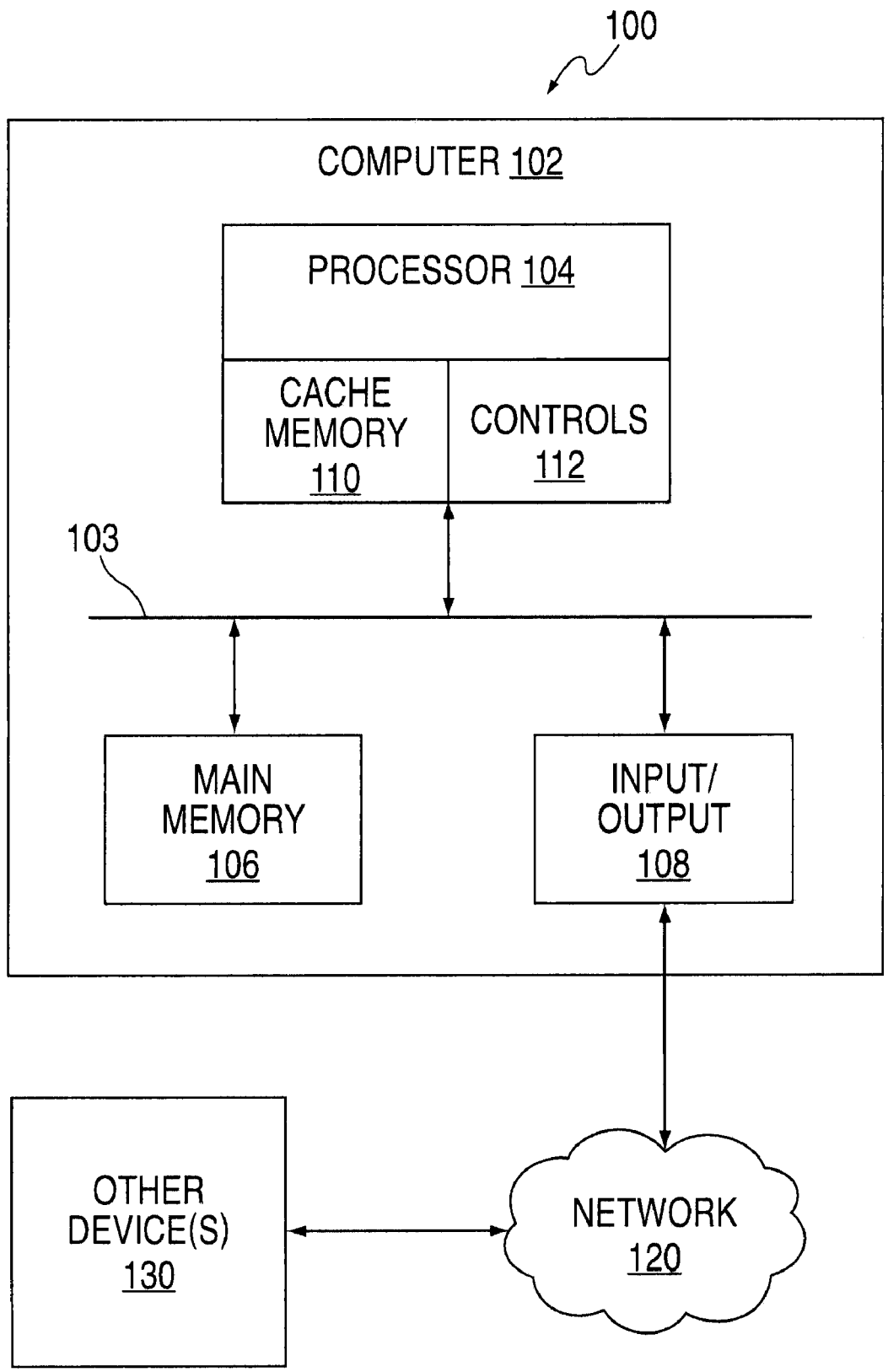
FIG. 1 is a block diagram illustrating an example of a computer system including an exemplary computing device configured for address generation checking.

Turning now to the drawings in greater detail, wherein like reference numerals indicate like elements, FIG. 1 illustrates an example of a computer system 100 including an exemplary computing device ("computer") 102 configured for address generation checking. In addition to computer 102, exemplary computer system 100 includes network 120 and other device(s) 130. Network 120 connects computer 102 and other device(s) 130 and may include one or more wide area networks (WANs) and/or local area networks (LANs) such as the Internet, intranet(s), and/or wireless communication network(s). Other device(s) 130 may include one or more other devices, e.g., one or more other computers, storage devices, peripheral devices, etc. Computer 102 and other device(s) 130 are in communication via network 120, e.g., to communicate data between them.

Exemplary computer 102 includes processor 104, main memory ("memory") 106, and input/output component(s) 108, which are in communication via bus 103. Processor 104 may include multiple (e.g., two or more) processors, which may implement pipeline processing, and also includes cache memory ("cache") 110, controls 112, and one or more components configured for address generation checking that will be described below. Cache 110 may include multiple cache levels (e.g., L1, L2, etc.) that are on or off-chip from processor 104 (e.g., an L1 cache may be on-chip, an L2 cache may be off-chip, etc.). Memory 106 may include various data stored therein, e.g., instructions, software, routines, etc., which, e.g., may be transferred to/from cache 110 by controls 112 for execution by processor 104. Input/output component(s) 108 may include one or more components, devices, etc. that facilitate local and/or remote input/output operations to/from computer 102, such as a display, keyboard, modem, network adapter, ports, etc. (not depicted).

Figure 2:
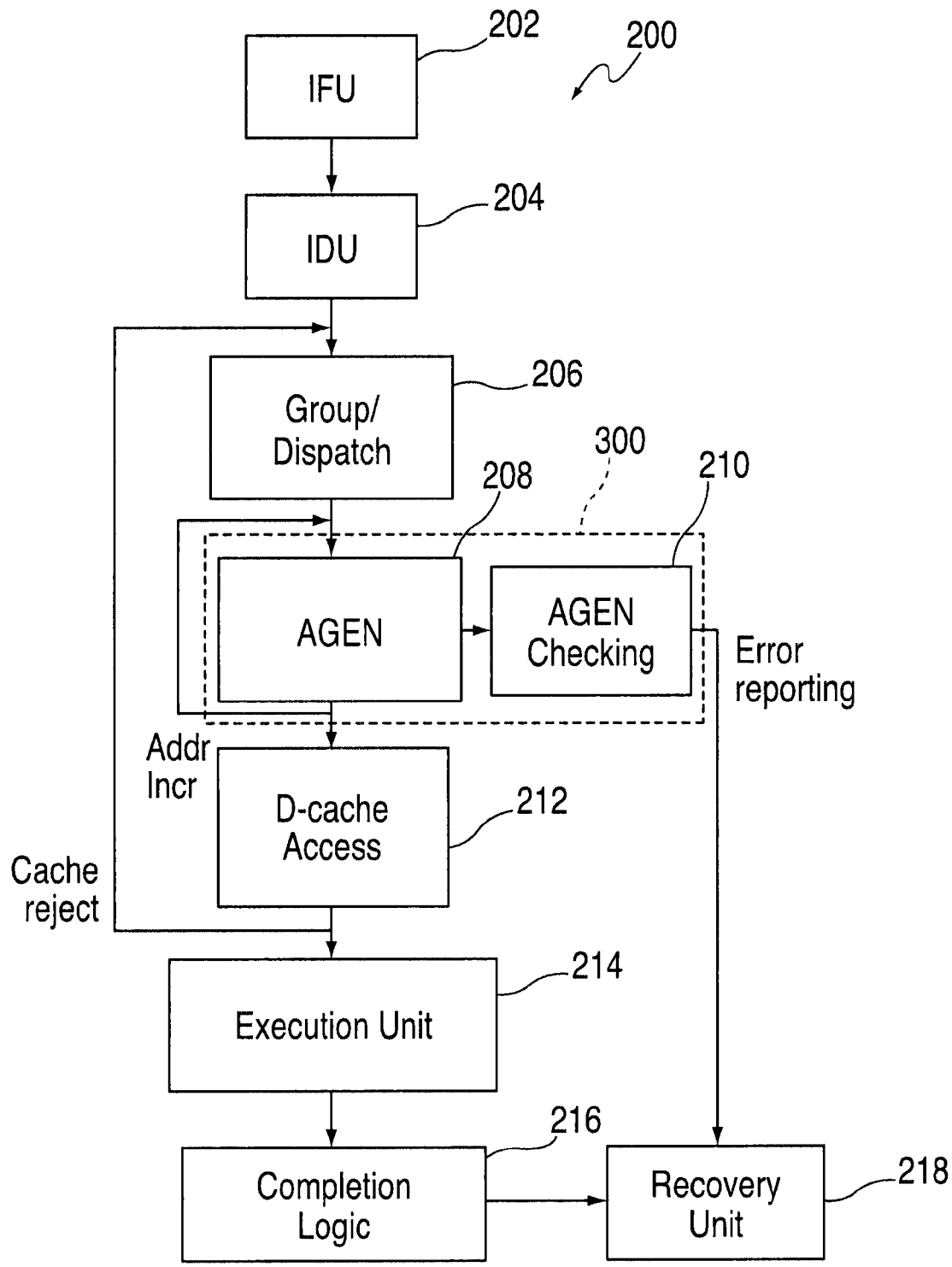
FIG. 2 is a block diagram illustrating an example of a processor subsystem of the exemplary computing device of FIG. 1 that is configured for address generation checking.

FIG. 2 illustrates an example of a processor subsystem 200 of exemplary computer 102 that is configured for address generation checking and is included, e.g., within processor 104. Exemplary subsystem 200 includes an exemplary subsystem 300 for address generation checking that will be described further below. Subsystem 200 also includes instruction fetch unit ("IFU") 202, which is in communication with an instruction cache ("I-cache") and configured to fetch instruction code stored in the I-cache (which, e.g., may be part of cache 110). IFU 202 is also in communication with instruction decode unit ("IDU") 206, which is configured to decode instructions into instruction processing data and may, e.g., include one or more instruction decoders. IDU 206 is in communication with group/dispatch unit ("GDU") 206, which is configured to group instruction processing data by grouping or separating it depending on whether the data can be concurrently processed (e.g., without causing hazards). GDU 206 is communication with address generation unit ("AGEN") 208 and also configured to dispatch the grouped instruction processing data to AGEN 208. AGEN 208 is configured to generate addresses based on the instruction processing data to fetch data and is in communication with address generation checking unit ("AGCU") 210, which will be discussed further below. Exemplary address checking subsystem 300 includes AGEN 208 and AGCU 210.

AGEN 208 is also in communication with data cache (D-cache) access unit ("DCAU") 212, which is configured to access data from a D-cache (which, e.g., may be part of cache 210). DCAU 212 is in communication with execution unit 214, which may include one or more units configured to execute the instruction processing data using the fetched data from the D-cache. For example, execution unit 214 may include a fixed point unit ("FXU"), a binary floating point unit ("BFU"), and a decimal floating point unit ("DFU"). Execution unit 214 is in communication with completion logic 216, which is configured to complete the instruction processing. Completion logic 216 is also in communication with recovery unit 218, to which it may provide instruction data for recovery operations by recovery unit 218. AGCU 210 is also in communication with recovery unit 218, to which it provides error reporting data (e.g., an error signal in response to an address generation error). Subsystem 200 also includes a feedback loop from the output of AGEN 208 to the input of AGEN 208, e.g., for address incrementation during address generation. Furthermore, subsystem 200 includes another feedback loop from the output of DCAU 212 to the input of GDU 206, e.g., for an instruction recycle, e.g., in response to an address generation error, a cache miss, etc.

Figure 3:
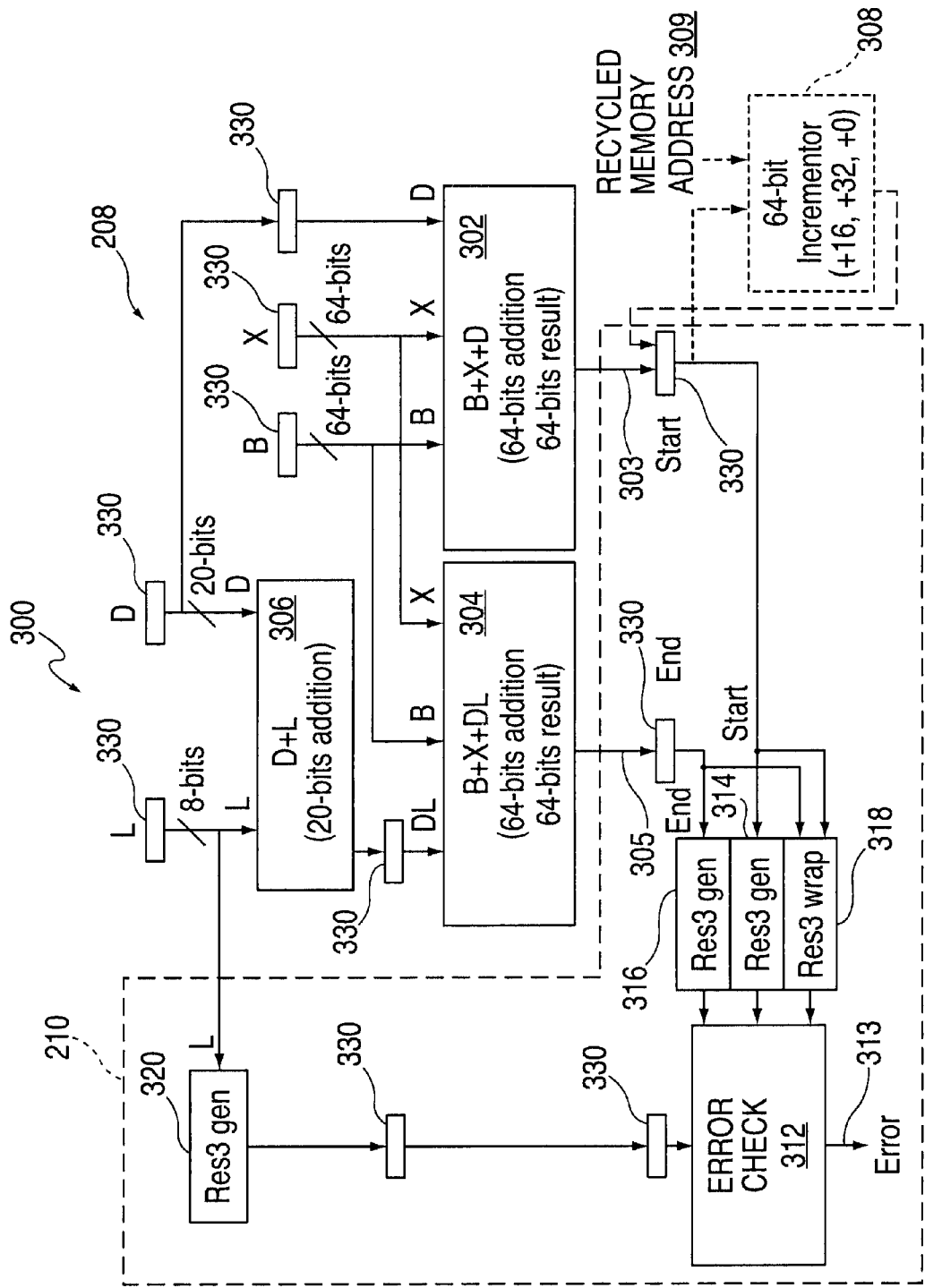
FIG. 3 is a block diagram illustrating an example of an address generation subsystem of the exemplary processor subsystem of FIG. 2 that is configured for address generation checking.

FIG. 3 illustrates an example of an address generation subsystem 300 of exemplary processor subsystem 200 that is configured for address generation checking. Exemplary AGEN subsystem 300 includes components of AGCU 210 in communication with components of AGEN 208. In that regard, components of AGEN 208 include address generation adder ("AA") 302 and AA 304, which are configured to output a start address 303 and end address 305, respectively, based on the inputs, of data to be fetched by DCAU 212. In some embodiments, AA 302 and 304 are configured to perform 64-bit 3-way additions with a 64-bit result. Inputs to AA 302 may include a base input B, an index input X, and a displacement input D (e.g., from GDU 206). Inputs to AA 304 may include base input B, index input X, and a displacement-length input DL. AGEN 208 also includes AA 306, which is configured to output displacement-length input DL to AA 304 based on the inputs and is in communication with AA 304. In some embodiments, AA 306 may be configured to perform 20 bit addition. Inputs to AA 306 may include a displacement input D and a length input L. Base input D, index input X, displacement input D, and length input L can be obtained from instruction processing data and used to generate a start (or starting) address for a data (data stream, etc.) and an end (or ending) address for the data, e.g., by AA 302, 304, 306, that can be used to fetch the data from a cache (e.g., cache 210) or memory (e.g., memory 106). In some embodiments AGEN 208 may be configured to form a branch target address for a branch instruction, and in such embodiments, AA 304 may be non-functioning or not included in AGEN 208.

In some embodiments, AGEN 208 may also include an address incrementor 308, which is configured to increment the start address by an additional amount for searches of memory blocks (cache lines, etc.) that are larger than the standard length by a multiple of the additional amount. For example, incrementor 308 may be a 64-bit incrementor configured to add 16 bits, 32 bits, etc. accordingly to the start address. In that regard, incrementor 308 is in communication with output 303 of AA 302 (e.g., on each side of a register or latch device 330) to update the start address output 303 communicated to AGCU 210. Incrementor 308 is also used for an operand that crosses a cache line boundary, thereby needing two memory accesses to get the storage data. AA 302 is used for the first access, and incrementor 308, using recycled memory address input 309, is used for the second access, as well as for long operand fetches. In some embodiments, the outputs of AA 302, 304, 306 are also used for normal address generation for processing by subsystem 200 of processor 104.

AGCU 210 includes error checking unit ("ECU") 312, which is configured to compare the end address from output 305 with a combination of length input L, the start address from output 303, and an address wrap indicator value. For example, ECU 312 compares the end address ("end") with the sum of the start address ("start") with the difference of length L ("len") to the address wrap indicator value ("wrap") to determine whether start+(len−wrap)=end. If the foregoing equality is true, then there is not an error in the address generation (e.g., in the circuitry or address data). If the foregoing equality is false, then an error is indicated. An output 313 from ECU 312 is generated accordingly. For example, ECU 313 may output a logic-0 signal if no error is determined or a logic-1 signal if an error is determined (or vice versa). Error output 313 can be communicated, e.g., to an instruction recovery unit 218, which may trigger a block of creating a checkpoint for the completion of instruction data processing and a recovery of the instruction data for reprocessing to negate the error (i.e., an error recovery operation). For example, a checkpoint and recovery operation may be triggered in which transient updates made as a result of processing instruction data are discarded and processing is restarted at the most previous checkpoint (i.e., correctly architected) state before the processing error occurred. Address wrap indicator value is dependent on whether there is an address wrap in light of the start address versus the end address, i.e., whether there is a wrap from the end of the memory block to the beginning of the memory block for the addressed data. Thus, the address wrap indicator value may be determined based on a comparison of the start address to the end address, e.g., by an address wrap determination logic (not depicted).

In some embodiments, the configuration and operation of ECU 312 is simplified by inputting modified values of the start address, end address, length, and wrap value. For example, these values may be modified by using a residue (or remainder) of the modulus of the value to reduce the bit length of the value for calculations by ECU 312. In some embodiments, the residue of a modulus-3 (modulo-3, mod3, etc.) operation ("modulus-3 residue" or "Res3") on the values may be used. In that regard, in some embodiments, AGCU 210 may include Res3 generation logic 314, 316, 318, and 320 in communication with length input L, start input 303, and start output 305, respectively, and ECU 312. Furthermore, Res3 generation logic 318 may include address wrap determination logic incorporated within it. The Res3 does not need to be generated for the inputs to AA 302, 304 for error checking in accordance with exemplary embodiments, which further reduces hardware overhead. Modulus and residue calculations, such as Res3, may be generated in various manners using various components, which may be known or apparent to one of ordinary skill in the art in light of the disclosure herein. AGEN 208 and AGCU 210 may also include one or more register devices 330 (e.g., a register, latch, or similar holding device) at various points (e.g., as depicted) to synchronize inputs and outputs with other components of AGEN subsystem 300.

Figure 4:
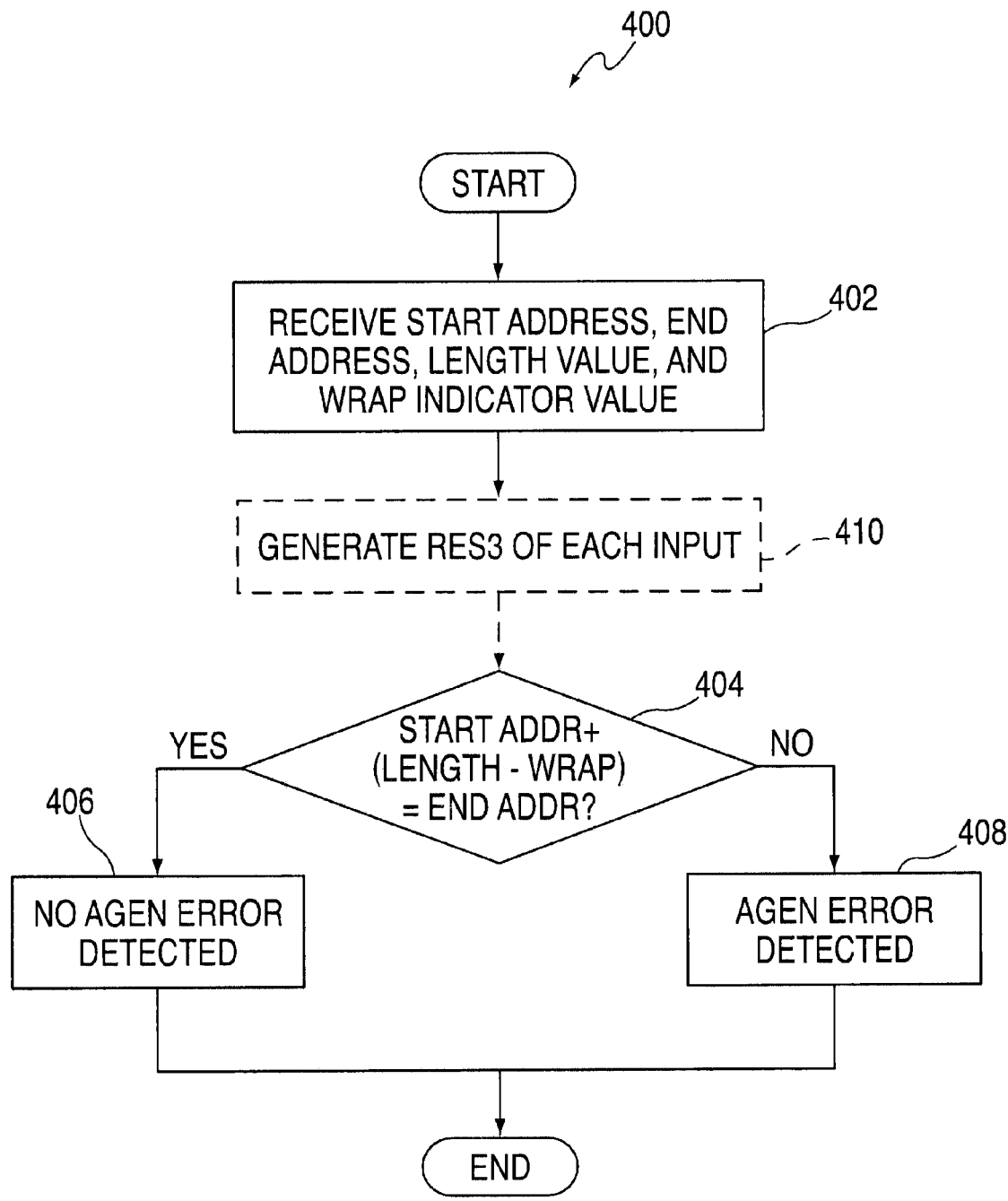
FIG. 4 is a flow diagram illustrating an example of a method for address generation checking executable, e.g., on the exemplary computing device of FIG. 1.

FIG. 4 illustrates an example of a method 400 for address generation checking executable, e.g., on exemplary computer 102. Exemplary method 400 may also describe an exemplary operation of AGCU 210. In block 402, a start address, end address, length value, address wrap indicator value are received (e.g., by ECU 312). As discussed above, the start address may be output from a first address generation adder (or address adder, e.g., AA 302), and the end address may be output from a second address adder (AA 304). The length value may be tapped off an input to a third address adder (e.g., AA 306) based on instruction processing data (e.g., from GDU 206). The address wrap indicator value may be based on a comparison of the start address to end address to determine if an address wrap occurs for the addressed data. In some embodiments, the residue of a modulus-3 operation ("Res3") on the values is generated in block 410 to, e.g., simplify the values (e.g., by reducing the bit length).

In block 404 a determination of whether the end address ("end") is equal to the sum of the start address ("start") added to the difference of length value ("len") to the address wrap indicator value ("wrap"), i.e., whether start+(len−wrap)=end. If the foregoing equality is true, then method 400 proceeds to block 406 in which it is determined that there is not an error in the address generation and an appropriate signal (e.g., logic-0) may be outputted (e.g., to recovery unit 218). If the foregoing equality is false, then method 400 proceeds to block 408 in which it is determined that there is an error in the address generation and an appropriate signal (e.g., logic-1) may be outputted (e.g., to recovery unit 218) to trigger an abort of the instruction completion followed by a recycle of the instruction to negate the error.

Figure 5:
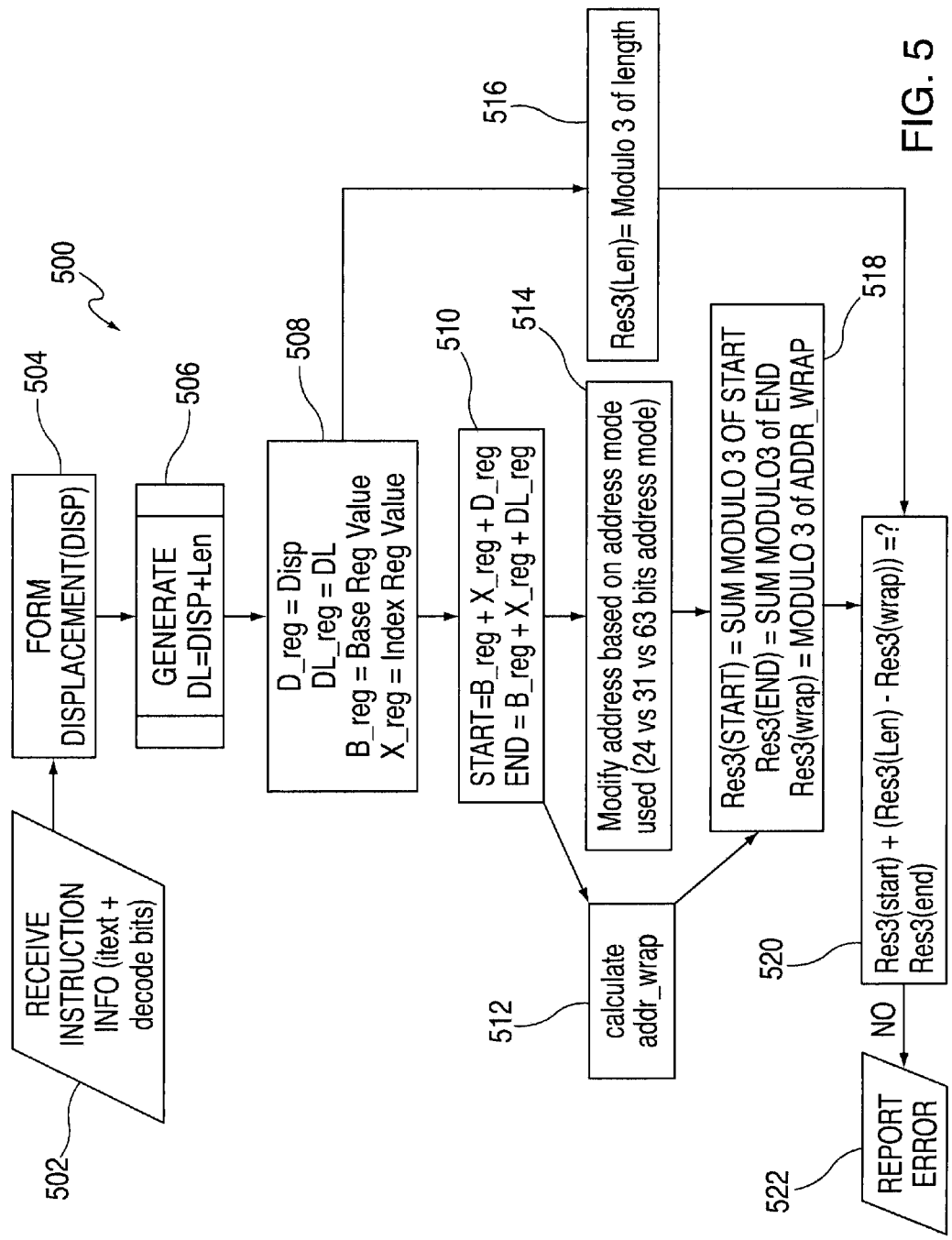
FIG. 5 is a flow diagram illustrating an example of a method for address generation checking in accordance with the exemplary method of FIG. 2.

FIG. 5 illustrates an example of a method 500 for address generation checking in accordance with exemplary method 400. Method 500 covers short (e.g., 8 bytes or less) fetch/store operations and also covers the AA's (first address generated) for a long (e.g., 9 bytes or more) fetch/store operations where the memory address is not defined to be relative with respect to the instruction address. Method 500 proceeds according to the following:

Block 502: Receive instruction processing data.

Block 504: Form Displacement in GDU 206; Displacement is 20-bits signed number; Formed as 33-bits signed number by doing 12-bit sign extension to be common with other AGEN usage.

Block 506: Disp_plus_Len=Disp+Length; Disp is 20-bits signed number; Length field has 8 significant bits for all instructions indicating a memory operand length ranges from 1 byte to 256 bytes; Disp_plus_Len is 33-bits signed binary number;

Block 508: D←Displacement from block 504; D register is 33 bits; Do Partial sign extension on the D register before feeding the adders in block 510. (e.g., replicate sign of Displacement to 5 latches) (sign_0008, sign_0917, sign_1826, sign_2729, sign_30);

DL register←Disp_plus_Len; DL register is 33 bits; Do Partial sign extension on the DL register before feeding the adders in block 510. (e.g., replicate sign of to 5 latches) (sign_DL_0008, sign_DL_0917, sign_DL_1826, sign_DL_2729, sign_DL_30);

Block 510:
start_addressess(0:63)=B(0:63)+X(0:63)+D_int(0:63).
This a 3-way 64-bits additions with no carry outs from the additions being saved. Bit 0 (e.g. start_addressess(0)) is the most significant bit and bit 63 is the least significant bit.
   a. D_int(00:08)<=sign_0008;
   b. D_int(09:17)<=sign_0917;
   c. D_int(18:26)<=sign_1826;
   d. D_int(27:29)<=sign_2729;
   e. D_int(30)<=sign_30;
   f. D_int(31:63)<=D(31:63);
   g. Each sign (e.g. sign_0008) should feed odd number of bits (in this case 9 bits for sign_0008) because if the sign bit flips, the error will be detected by the equation in block 520.

end_address(0:63)=B(0:63)+X(0:63)+DL_int(0:63). This a 3-way 64-bits addition with no carry outs from the additions being saved. Bit 0 (e.g. end_address(0)) is the most significant bit and bit 63 is the least significant bit.
   a. DL_int(00:08)<=sign_dl_0008;
   b. DL_int(09:17)<=sign_dl_0917;
   c. DL_int(18:26)<=sign_dl_1826;
   d. DL_int(27:29)<=sign_dl_2729;
   e. DL_int(30)<=sign_dl_30;
   f. DL_int(31:63)<=DL(31:63);

Block 512: Calculate the wrap address indication. i.e. when fetch/store data wraps around storage (end_address<start_address); Maximum length size for hardware executed operations is 255; Address wrap can be calculated as:
   wrap_address_case1<=start_address(0)='1' and end_address(0)='0' for 64-bit addressing mode.
   wrap_address_case2<=start_address(33)='1' and end_address(33)='0' for 31-bit addressing mode.
   wrap_address_case3<=start_address(40)='1' and end_address(40)='0' for 24-bit addressing mode.

The processor operates in 3 different memory addressing mode. In 24-bit mode, programs and applications form their address as a maximum of 24 bits and hardware is designed to be backward compatible with such programs. Similarly in programs written for 31-bit address computations forms addresses that are 31-bit wide. The AGEN 208 is designed to operate on 24, 31 and 64-bit addressing modes.

Block 514: For 31-bit addressing mode, clear bits 0:32 of start_address and end_address; For 24-bit addressing mode, clear bits 0:39 of start_address and end_address. This step is to convert the 64-bit additions (block 510) that is performed regarding of the addressing mode to an address compatible with the program running on the processor.

Block 516: Calculate Res3_len as Res3 for the Length field.

Block 518: Calculate Res3_start_address=Modulo 3 for the start_address(0:63); Res3_end_address=Modulo 3 for the end_address(0:63);

$$Res3\_wrap = 1 \text{ for wrap\_address\_case1 or wrap\_address\_case3.}$$
$$= 2 \text{ for wrap\_address\_case2.}$$
$$= 0 \text{ if no wrap.}$$

Blocks 520, 522: To cover 100% of bit flips in start_address, end_address, D register, DL register, wrap_address indication:

Res3_start_address+(Res3_len−Res3_wrap)=Res3_end_address should be true otherwise set an error; If, for example, bit I is flipped in start_address causing the faulty output to be start_address', then start_address'=start_address±2^^I (± depending on the direction of the flip)

Res3(start_address')=Res3(start_address)±1 (or 2) depending if bit-I is even or odd.

(Res3(2^^I)=1 when I is even. (bit0 is most significant bit and bit63 is least significant bit).

(Res3(2^^I)=1 when I is odd. ((bit0 is most significant bit and bit63 is least significant bit).

Since Res3(start_address') does not equal to Res3(start_address)=>Equation will not hold and bit flip is detected.

Figure 6:
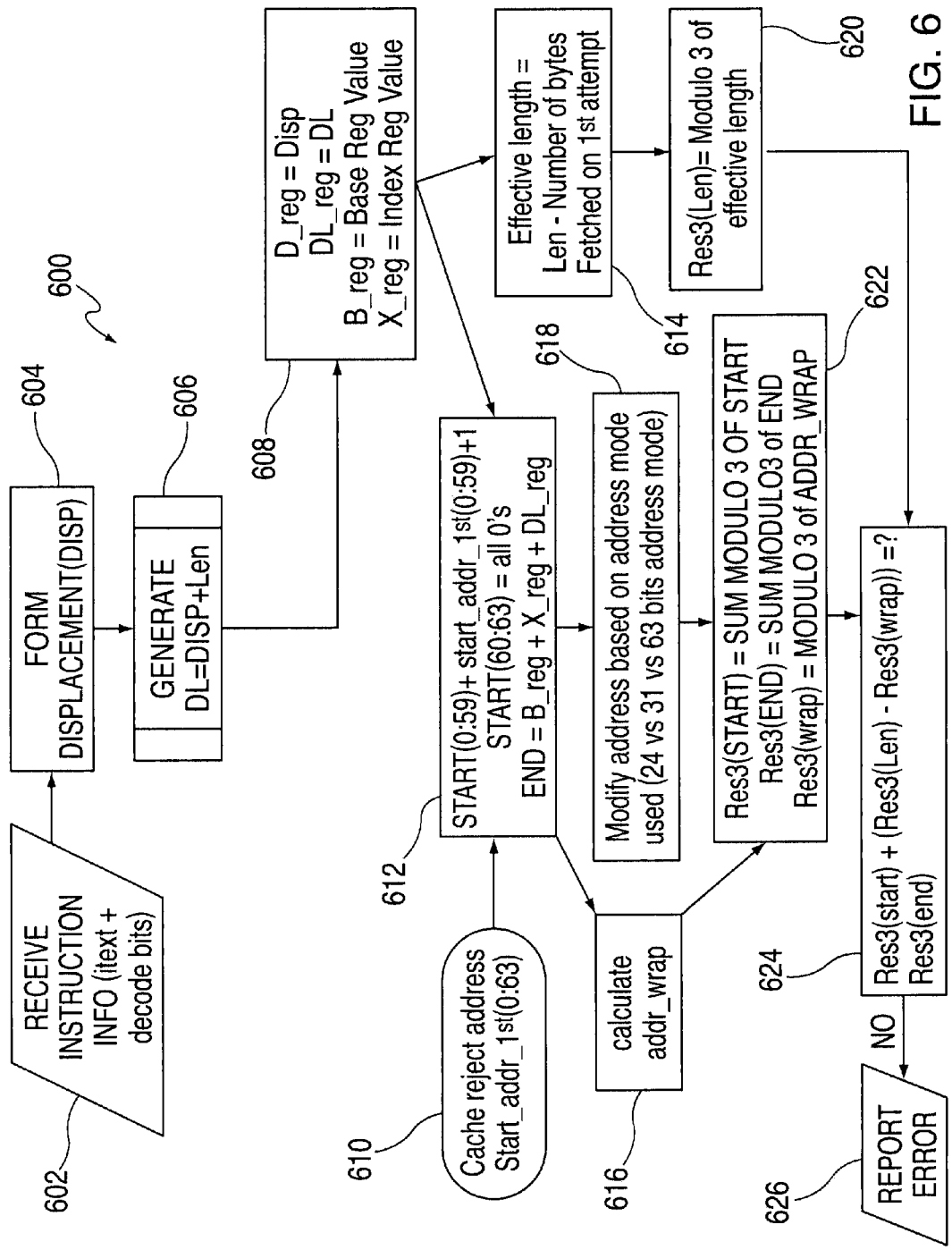
FIG. 6 is a flow diagram illustrating another example of a method for address generation checking in accordance with the exemplary method of FIG. 2.

FIG. 6 illustrates an example of a method 600 for address generation checking in accordance with exemplary method 400. Method 600 covers address adder for a line reject that may occur for the first fetch since all subsequent fetches are quad-word aligned. In a line crossing case, the bytes requested for a fetch crosses a cache boundary line and another fetch is needed to get the rest of the operand bytes. For example, if an instruction is fetching 8 bytes from memory and the most significant 3 bytes are located at the end of a cache line and remaining 5 bytes are located at the beginning of the next cache line, the first fetch to memory will return the first 3 bytes in the first line and the second fetch for an address pointing to the beginning of the second cache line will return the remainder 5 bytes. Method 600 to cover the address adder for the second fetch proceeds according to the following:

Block 602: same as block 502.
Block 604: same as block 504.
Block 606: same as block 506.
Block 608: same as block 508.

Block 610: Start_address_1$^{st}$ is the first fetch address which is returned from memory due to cache reject (line crossing). This address (AA) is initially formed in block 510 and is returned by the cache memory controls because of a memory operands crosses a line. A line crossing is one case of a cache reject described in FIG. 2 as a path from data cache 212 and GDU 206. In this example, a cache line is 256 bytes in size.

Block 612: During the re-dispatch of the instruction after line reject:

start_address(0:59)<=start_address_1st(0:59)+"1". (equivalent to +16).

start_address(60:63)<="0000". The start address will not point to the beginning of the 2$^{nd}$ line.

end_address<=B+X+DL_int

Block 614: Calculate The effective length of this fetch. effective_len=Length−(8−start_address_1st(61:63)); Represents the bytes that will be fetched after the line rejected fetch. The number of bytes fetched in the 1st AA are subtracted from the total length to get the effective length. As in prior example, if an instruction is fetching 8 bytes and the most significant 3 bytes are located at the end of one cache line and the remainder 5 bytes are located at the beginning of next cache line, then the effective length of the fetch is equal to 5 (8−3).

Block 616: same as block 512
Block 618: same as block 514.
Block 620: same as block 516.
Block 620: same as block 516.
Block 622: same as block 518.
Blocks 624, 626: same as blocks 520, 522.

Figure 7:
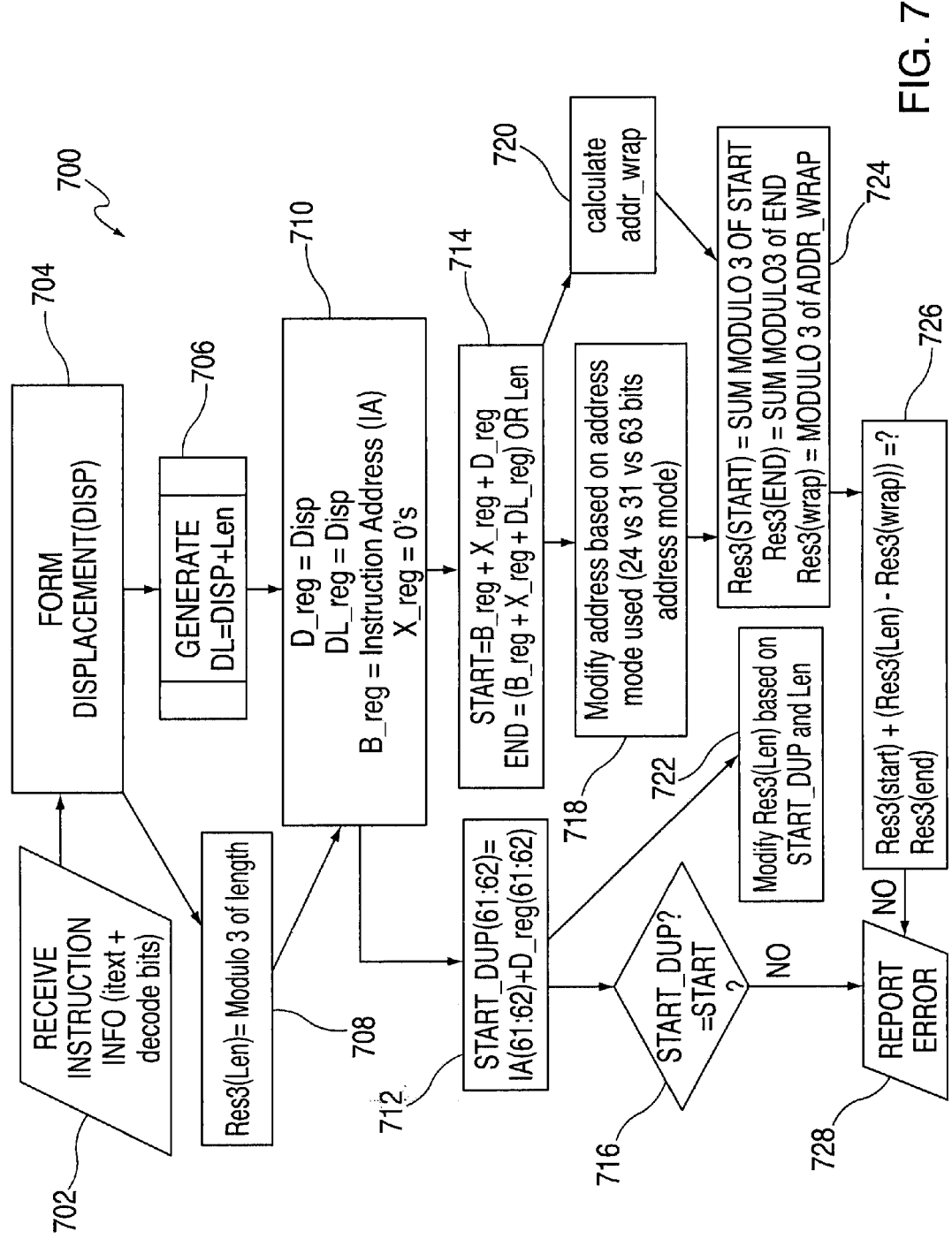
FIG. 7 is a flow diagram illustrating another example of a method for address generation checking in accordance with the exemplary method of FIG. 2.

FIG. 7 illustrates an example of a method 700 for address generation checking in accordance with exemplary method 400. Method 700 covers fetch/store relative operations in which the store/fetch address is formed as a displacement from the instruction address. The displacement specified in the instruction text represents the singed number of halfwords (2 bytes) relative to the instruction address. For these instructions, length is 0 for 1 byte cache access, 1 for 2 bytes cache access, 3 for 4 bytes cache access and 7 for 8 bytes cache access. Also, these operand access for these instructions needs to be operand access aligned otherwise a specification address exception is realized. For example, an address for a 4 bytes access needs to be word aligned (i.e. least significant 2 bits of address are 0's) and an 8 byte access needs to be double words aligned (.e. least significant 3 bits of address are 0's). Method proceeds according to the following:

Block 702: same as block 502.
Block 704: Form displacement;
Block 706: same as block 506.
Block 708: same as block 516.

Block 710: D is set as in block 508. In this example, DL is set to the same value as D. In the previous examples like in FIG. 5 and FIG. 6, DL used to be set to the addition of displacement and length. In this example, displacement from the instruction text needs to be shifted first before being used since it represents the number of halfwords, there was no time in a cycle to locate the displacement from, shift it left by 1 and add it to length field. This example, relied on the fact that the address is aligned to the length of the memory access and as result the start address least significant 1, 2 or 3 bits are 0's depending on the length of operand fetch. Therefore the end address is the logical OR of the start address with the length field. A bit flip in the least significant bits of the starting address needs to be identified as an error instead of causing an address exception because the address is not aligned to storage operand length.

Block 712: Calculate dup_start_address(61:62)=IA(61:62)+D(61:62); note that IA(63) and D(63) are 0's in this example since instruction address is even and D is formed by the instruction displacement field by shifting it left by 1 bit. Dup_start_address is used to check against start_address(61:62).

Block 714: start_address=B(0:63)+X(0:63)+D_int(0:63); end_address=(B+X+DL_int) OR Length. In this example, DL=D from block 710 (since starting address is aligned, then adding length is equivalent to logical-OR'ing it).

Block 716: If start_dup does not equal to start, report error per block 728

Block 718: Same as block 514.

Block 720: same as block 512.

Block 722: Adjust Res3 length based on dup_start_address (61:62) and least significant 2 bits of the length (length(5:6) (len(0:4)=0's). This is needed since the end_address least significant bits are formed by logical ORing the start_address with the Length: Note in a Residue 3 arithmetic, subtracting 2 is identical to adding 1 and subtracting 1 is identical to adding 2. Adjust Res3 of length(0:7) as follows:

| dup_start_address (61:62) | length (5:6) | adjust by |
| --- | --- | --- |
| 00 | xx | 0 |
| 01 | x1 | −2 (or +1) |
| 10 | 1x | −1 (or +2) |
| 11 | 01 | −2 (or +1) |
| 11 | 10 | −1 (or +2) |
| 11 | 11 | 0 |

Block 724: same as block 518.

Blocks 726, 728: same as blocks 520, 522.

Figure 8:
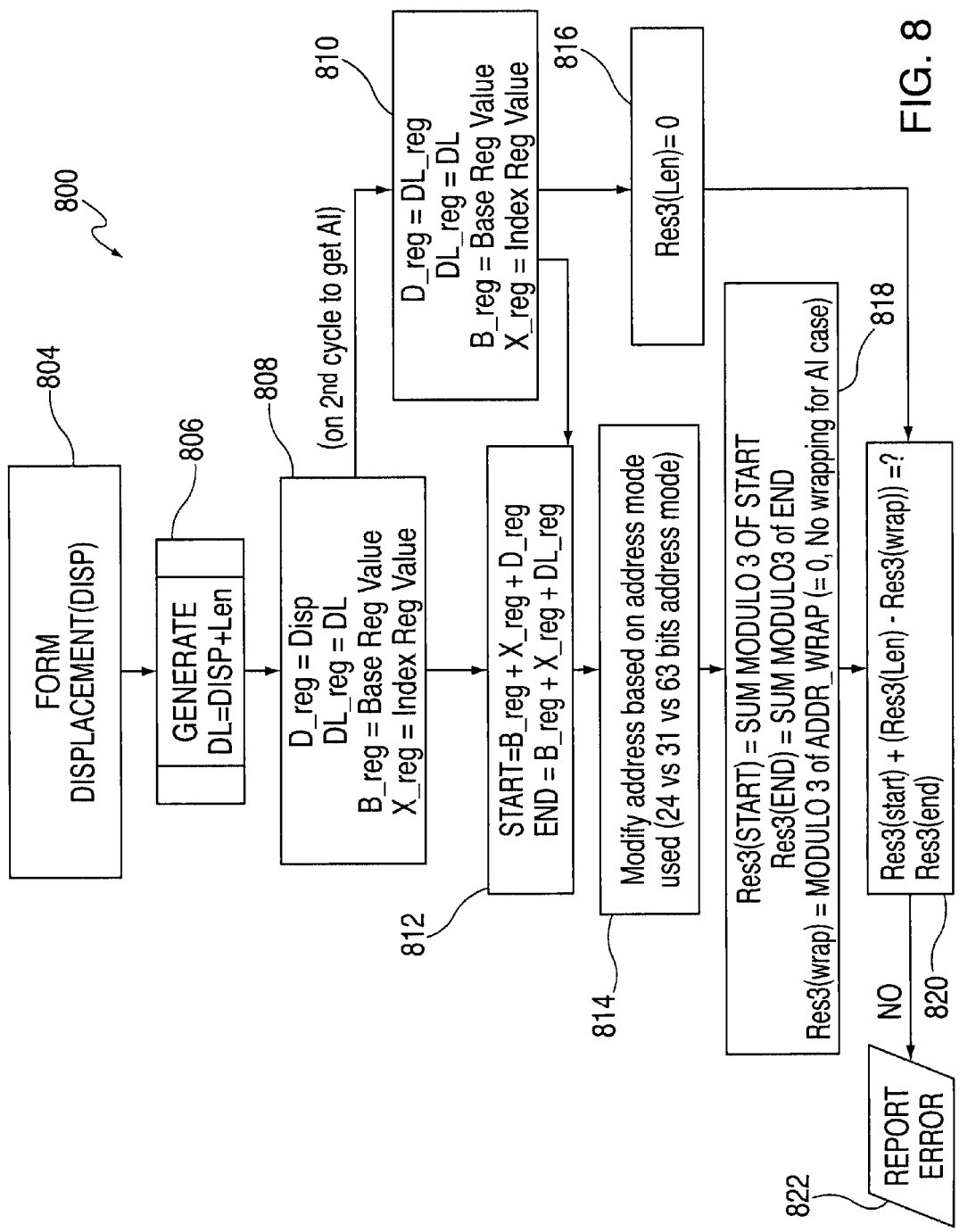
FIG. 8 is a flow diagram illustrating another example of a method for address generation checking in accordance with the exemplary method of FIG. 2.

FIG. 8 illustrates an example of a method 800 for address generation checking in accordance with exemplary method 400. Method 800 covers a long store (9 bytes to 256 bytes stores) type instructions similar to store STM (store multiple). For a long store type instruction, two cache accesses are needed (these cache accesses are referred to as cache pretests allocating store queue/buffer and checks for cache exception) In specific, this method covers the $2^{nd}$ cache access since the $1^{st}$ cache access is covered by the method described in FIG. 5. Method proceeds according to the following:

Block 802 (not shown): same as block 502.

Block 804: same as block 504.

Block 806: same as block 506.

Block 808: same as block 508.

Block 810: This represents the $2^{nd}$ cycle when the Address Increment (AI) is generated The first address (AA) is calculated like in FIG. 5 by going from block 808 to block 812. Note that the D register is set to the previous value of DL, and the values of B and X and DL are held.

Block 812: same as block 510.

Block 814: same as block 514.

Block 816: Set Res3 of Length to 0 since the start_address for this AI is expected to pint to least significant byte of the storage operand. In other words, start_address=end_address for the address increment (AI) of this long store; therefore Res(Length)=0.

Block 818: Same as block 518.

Blocks 820, 822: same as blocks 520, 522.

Figure 9:
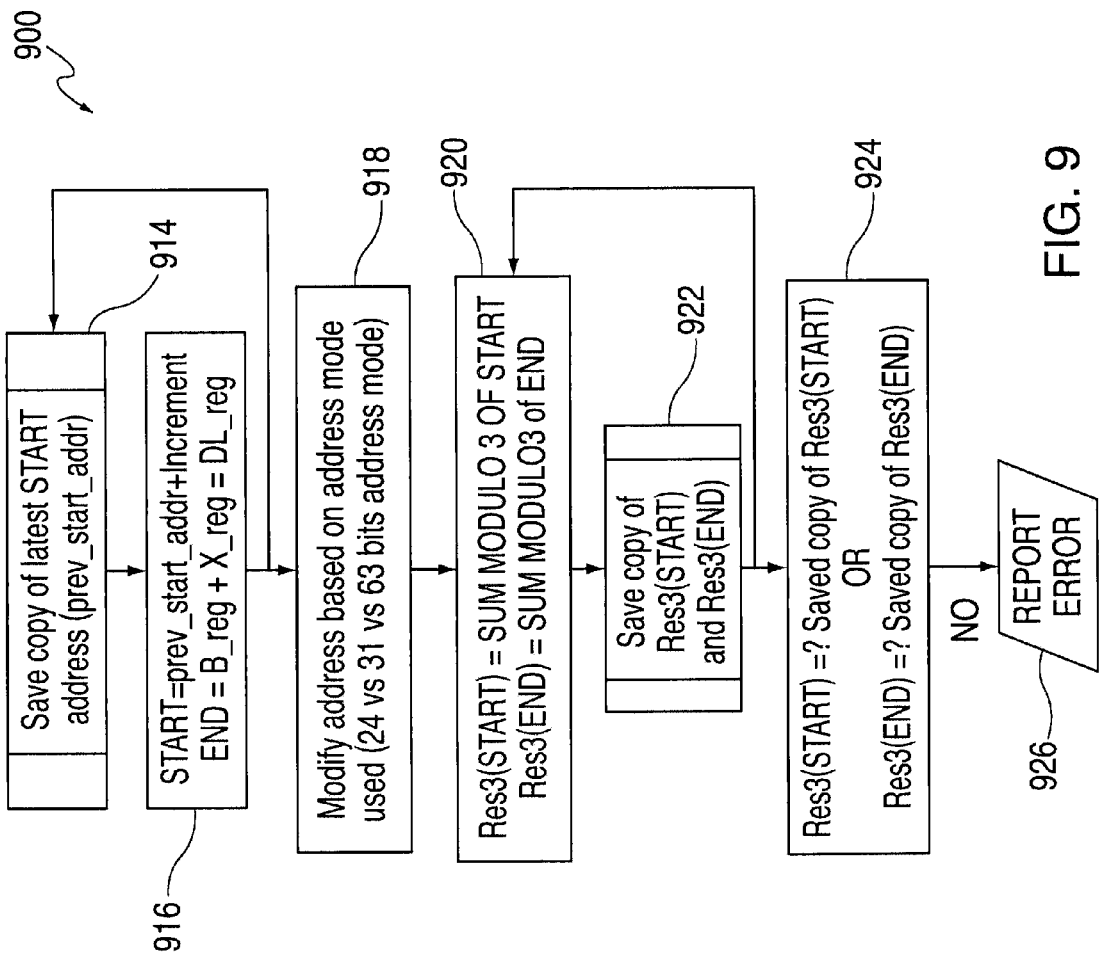
FIG. 9 is a flow diagram illustrating another example of a method for address generation checking in accordance with the exemplary method of FIG. 2.

FIG. 9 illustrates an example of a method 900 for address generation checking in accordance with exemplary method 400. Method 900 covers long operand fetches (more than 9 bytes) where many fetches to memory are needed to fetch all the bytes of the operand. Examples on this long operand fetch instructions are Load Multiple (e.g. LM, LMG) and Move Character Long (MVC). As indicated before, the first fetch to a long operand is referred to as AA and is covered by Method of FIG. 5, and all subsequent fetches (AI's) are covered by this method. Method proceeds as follows;

Block 902 (not shown): same as block 502.

Block 904 (not shown): same as block 504.

Block 906 (not shown): same as block 506.

Block 908 (not shown): same as block 508.

Block 910 (not shown): same as block 510.

Block 912 (not shown): same as block 518.

Block 914: Save copy of latest START address (prev_start_address).

Block 916:
START=prev_start_address+Increment;
END=B_reg+X_reg+DL_int.

Block 918: same as block 514.

Block 920: same as block 518, except no wrap.

Block 922: Save copy of Res3(START) and Res3(END)

Blocks 924, 926: Res3_start_address_ai should be equal to saved Res3_end_address, otherwise report an error. The process can be also covered by a method similar to method 600 of FIG. 6 by adjusting the length for every new address increment AI. i.e. the effective length for an AI will be the total length of the operand minus the number of bytes fetched so far. In this case, checking can be made similar to Block 624.

Figure 10:
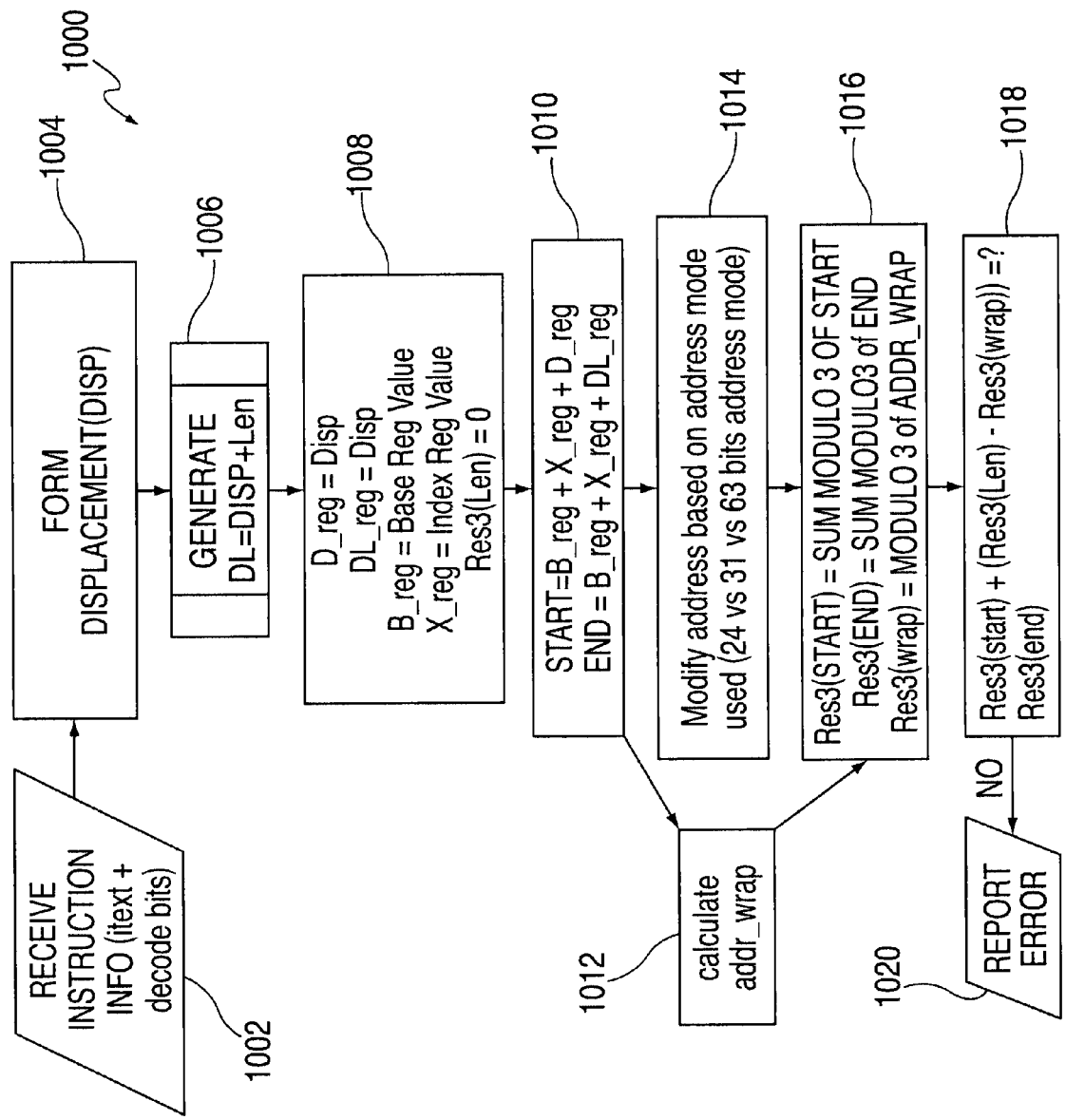
FIG. 10 is a flow diagram illustrating another example of a method for address generation checking in accordance with the exemplary method of FIG. 2.

FIG. 10 illustrates an example of a method 1000 for address generation checking in accordance with exemplary method 400. Method 1000 covers usage of AGEN adders for non store/fetch operations, such as load address type instructions (e.g. LA, LAE, LAY, etc.) and branch target address, etc., and proceeds according to the following:

Block 1002: same as block 502.

Block 1004: same as block 504.

Block 1006: same as block 506.

Block 1008: same as block 508, except Len set to 0 (thus, Res3(Len)=0).

Block 1010: same as block 510.

Block 1012: same as block 512.

Block 1014: same as block 514.

Block 1016: same as block 518.

Blocks 1018, 1020: same as blocks 520, 522.

Elements of exemplary computer system 100, exemplary processor subsystem 200, and address generation subsystem 300 are illustrated and described with respect to various components, modules, blocks, etc. for exemplary purposes. It should be understood that other variations, combinations, or integrations of such elements that provide the same features, functions, etc. are included within the scope of embodiments of the invention.

The flow diagram described herein is just an example. There may be many variations to this diagram or the blocks (or operations) thereof without departing from the spirit of embodiments of the invention. For instance, the blocks may be performed in a differing order, or blocks may be added, deleted or modified. All of these variations are considered a part of the claimed invention. Furthermore, although an exemplary execution of the flow diagram blocks is described with respect to elements of exemplary computer system 100, exemplary processor subsystem 200, and address generation subsystem 300, execution of the flow diagram blocks may be implemented with respect to other systems, subsystems, etc. that provide the same features, functions, etc. in accordance with exemplary embodiments of the invention.

As described above, embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A computer implemented method for address generation checking, the method comprising:
    receiving a starting memory address for a data, an ending memory address for the data, a length value of the data, and an address wrap indicator value that indicates if the data wraps from an end of a memory block to a start of the memory block;
    generating a modulus-3 residue of the starting memory address, the ending memory address, the length value, and the address wrap indicator value;
    determining, by a computer, that the ending memory address is not equal to a sum of the starting memory address added to a difference of the length value to the address wrap indicator value, wherein the determining comprises determining that the modulus-3 residue of the ending memory address is not equal to a sum of the modulus-3 residue of the starting memory address added to a difference of the modulus-3 residue of the length value to the modulus-3 residue of the address wrap indicator value;
    transmitting an error signal that indicates that an error occurred in a generation of at least one of the starting memory address and the ending memory address, the transmitting responsive to the determining; and
    triggering a blocking of a checkpoint operation for a completion of a processing of the data.

2. The method of claim 1, further comprising:
    generating the starting memory address with a first address generation adder;
    generating the ending memory address with a second address generation adder;
    generating the length value with an instruction decoder; and
    generating the address wrap indicator value based on a comparison of the starting memory address to the ending memory address.

3. The method of claim 2, further comprising generating a displacement-length value by adding a displacement value and the length value with a third address generation adder, and wherein:
    generating the starting memory address comprises adding a base value, an index value, and a displacement value, and
    generating the ending memory address comprises adding the base value, the index value, and the displacement-length value.

4. The method of claim 2, further comprising incrementing the starting memory address by an additional amount to allow a search of a memory block that is longer than a standard length by a multiple of the additional amount.

5. The method of claim 1, further comprising:
    triggering an error recovery operation.

6. The method of claim 1, wherein the data is stored in a cache memory.

7. The method of claim 1, wherein the data is stored in a main memory.

8. A system for address generation checking, the system comprising an address generation checking unit configured for:
    receiving a starting memory address for a data, an ending memory address for the data, a length value of the data, and an address wrap indicator value that indicates if the data wraps from an end of a memory block to a start of the memory block;
    generating a modulus-3 residue of the starting memory address, the ending memory address, the length value, and the address wrap indicator value;
    determining, by a computer, that the ending memory address is not equal to a sum of the starting memory address added to a difference of the length value to the address wrap indicator value, wherein the determining comprises determining that the modulus-3 residue of the ending memory address is not equal to a sum of the modulus-3 residue of the starting memory address added to a difference of the modulus-3 residue of the length value to the modulus-3 residue of the address wrap indicator value;
    transmitting an error signal that indicates that an error occurred in a generation of at least one of the starting memory address and the ending memory address, the transmitting responsive to the determining; and
    trigger a blocking of a checkpoint operation for a completion of a processing of the data.

9. The system of claim 8, wherein the address generation checking unit is further configured for generating the address wrap indicator value based on a comparison of the starting memory address to the ending memory address, and the system further comprises:
    a first address generation adder in communication with the address generation checking unit and configured to generate the starting memory address;
    a second address generation adder in communication with the address generation checking unit and configured to generate the ending memory address; and
    an instruction decoder in communication with the address generation checking unit and configured to generate the length value.

10. The system of claim 9, further comprising a third address generation adder in communication with the second address generation adder and configured to generate a displacement-length value by adding a displacement value and the length value, wherein the starting memory address is generated by adding a base value, an index value, and a displacement value and the ending memory address is generated by adding the base value, the index value, and the displacement-length value.

11. The system of claim 9, further comprising an address incrementor in communication with the first address generation adder and configured to increment the starting memory address by an additional amount to allow a search of a memory block that is longer than a standard length by a multiple of the additional amount.

12. The system of claim 8, wherein the address generation checking unit is further configured to:
   trigger an error recovery operation.

13. A computer program product for address generation checking, the computer program product comprising:
   a tangible storage medium readable by a processing circuit and storing instructions for execution by the processing circuit for performing a method comprising: receiving a starting memory address for a data, an ending memory address for the data, a length value of the data, and an address wrap indicator value that indicates if the data wraps from an end of a memory block to a start of the memory block;
   generating a modulus-3 residue of the starting memory address, the ending memory address, the length value, and the address wrap indicator value;
   determining, by a processor, that the ending memory address is not equal to a sum of the starting memory address added to a difference of the length value to the address wrap indicator value, wherein the determining comprises determining that the modulus-3 residue of the ending memory address is not equal to a sum of the modulus-3 residue of the starting memory address added to a difference of the modulus-3 residue of the length value to the modulus-3 residue of the address wrap indicator value;
   transmitting an error signal that indicates that an error has occurred in a generation of at least one of the starting memory address and the ending memory address, the transmitting responsive to the determining; and
   triggering a blocking of a checkpoint operation for a completion of a processing of the data.

14. The computer program product of claim 13, wherein the method further comprises:
   generating the address wrap indicator value based on a comparison of the starting memory address to the ending memory address.

15. The computer program product of claim 14, wherein the method further comprises generating a displacement-length value by adding a displacement value and the length value, and wherein generating the starting memory address comprises adding a base value, an index value, and a displacement value; and
   generating the ending memory address comprises adding the base value, the index value, and the displacement-length value.

16. The computer program product of claim 14, wherein the method further comprises incrementing the starting memory address by an additional amount to allow a search of a memory block that is longer than a standard length by a multiple of the additional amount.

17. The computer program product of claim 13, wherein the method further comprises:
   triggering an error recovery operation.

* * * * *